United States Patent [19]

Brown et al.

[11] Patent Number: 5,632,795

[45] Date of Patent: May 27, 1997

[54] REDUCTION OF NITROGEN CONTAINING GLASS BATCH MATERIALS USING EXCESS OXYGEN

[75] Inventors: John T. Brown, Corning; Arlene K. McMahon, Elmira, both of N.Y.

[73] Assignee: Corning Incorporated, Corning, N.Y.

[21] Appl. No.: 372,986

[22] Filed: Jan. 17, 1995

[51] Int. Cl.$^6$ .................................................... C03B 5/16
[52] U.S. Cl. ............................ 65/157; 65/134.4; 501/27; 501/41
[58] Field of Search .................... 65/134.4, 157; 501/27, 41

[56] References Cited

U.S. PATENT DOCUMENTS

| | | |
|---|---|---|
| 3,592,622 | 7/1971 | Shepherd . |
| 3,830,749 | 8/1974 | Deeg et al. . |
| 3,856,496 | 12/1974 | Nesbitt et al. . |
| 4,061,487 | 12/1977 | Kiyonaga . |
| 4,519,814 | 5/1985 | Demarest . |
| 4,545,800 | 10/1985 | Won et al. . |
| 4,599,100 | 7/1986 | Demarest, Jr. ................ 65/134.4 |
| 4,604,123 | 8/1986 | Desprez et al. . |
| 4,704,153 | 11/1987 | Schwenninger et al. . |
| 5,006,141 | 4/1991 | Chea et al. . |
| 5,139,558 | 8/1992 | Lauwers . |
| 5,147,438 | 9/1992 | Castelain et al. . |
| 5,158,590 | 10/1992 | Jouvaud et al. . |
| 5,346,524 | 9/1994 | Shamp et al. .................. 65/134.4 |
| 5,417,732 | 5/1995 | Shamp et al. .................. 65/134.4 |

OTHER PUBLICATIONS

Hawley, Gessner G., The Condensed Chemical Dictionary, Tenth Edition, p. 728.

Primary Examiner—Donald E. Czaja
Assistant Examiner—Michael Philip Colaianni
Attorney, Agent, or Firm—Robert L. Carlson

[57] ABSTRACT

A method for decreasing the amount of nitrogen and oxygen containing compounds employed in glass batch mixtures. Oxygen fuel burners are utilized to provide an oxidizing atmosphere to the molten glass in the place of the reduced or eliminated nitrogen and oxygen containing compounds.

20 Claims, 1 Drawing Sheet

REDUCTION OF NITROGEN CONTAINING GLASS BATCH MATERIALS USING EXCESS OXYGEN

FIELD OF THE INVENTION

The present invention relates to methods for melting batch materials in a glass making furnace. More particularly, the invention is directed to providing a sufficient amount of excess oxygen gas to replace nitrogen containing materials which normally are employed in the batch.

BACKGROUND OF THE INVENTION

Currently, the glass manufacturing industry is under considerable pressure to reduce the amount of pollutants which are emitted into the atmosphere as a result of the glass melting process. One such particular family of pollutants is nitrogen oxide compounds (commonly referred to as NOX). In this regard, oxygen/fuel (oxy-fuel) burners have been employed in place of the more conventional air fuel burners which historically were employed in glass making furnaces. Air consists of about 78 percent nitrogen, while the "oxygen" gas utilized in oxy-fuel burners typically contains about 0.1–6 percent nitrogen and 0.1–4 percent argon, the remainder being oxygen (typically 90–99.8 percent). By employing oxy-fuel burners, the amount of nitrogen (NOX) emitted by such glass furnaces into the atmosphere is reduced. Unfortunately, in some glass batches it has still been desirable to employ some nitrogen containing materials in the batch. For example, niter is commonly employed because of its ability to enhance the oxidizing ability of the glass batch. Niter, which can be, for example, in the form of potassium nitrate, sodium nitrate, or barium nitrate, releases oxygen into the glass batch, thereby oxidizing the batch directly (as opposed to providing a more oxidizing atmosphere above the glass).

One family of glasses for which nitrogen containing compounds continue to be a particular problem are lead containing glasses. Lead-containing glasses effectively shield high-energy radiation and are therefore used commercially for radiation windows, fluorescent lamp envelopes, and television bulbs. During the manufacture of lead-containing glass, if the atmosphere inside the glass melting furnace is not sufficiently oxidizing, the lead oxide has a tendency to reduce and precipitate as a liquid metal, resulting in a deficiency of lead oxide in the glass. Such precipitation of the lead could have extremely deleterious consequences, as the lead oxide is utilized to protect consumers from x-rays produced inside the television.

As a consequence, in the television tube and other lead glass making industries, relatively large quantities of niter have commonly been added as a glass batch material to provide an extremely oxidizing atmosphere inside the batch blanket. The niter releases oxygen into the glass melt, thereby preventing reduction of the lead oxide. Unfortunately, the niter also contains nitrogen, and consequently results in increased NOX which are exhausted from the glass tank furnace.

Historically, lead glasses were melted using air/fuel burners, and niter was added in relatively large quantities to prevent reduction of the lead oxide in the melt to lead metal. Although oxy-fuel burners have since been employed in place of the air/fuel burners in such glass melting processes, the lead glasses have still utilized relatively large quantities of niter compounds in the glass batch to prevent precipitation of lead oxide. For example, in some television tube manufacturing furnaces which do not employ the methods of the present invention (but do employ oxy-fuel burners), 75 to 80 percent of the total NOX emitted from the process is due to the use of niter as a batch material.

It would therefore be desirable to be able to manufacture glasses which require strongly oxidizing atmospheres, particularly lead containing glasses, without the need for having to use large quantities of nitrogen containing materials in the batch.

SUMMARY OF THE INVENTION

The present invention relates to methods for providing an oxidizing atmosphere in a glass melting operation, while at the same time reducing the amount of nitrogen containing compounds needed to provide the oxidizing atmosphere. It has been found that, by increasing the amount of oxygen supplied to the glass melting furnace, the amount of nitrogen containing compounds can be appreciably reduced and in some cases even eliminated without deleteriously effecting the oxidizing quality of the glass melt. Consequently, even for materials which utilize heavy metals such as lead, which are more susceptible to reduction in the melt, the amount of niter can be drastically reduced. The fact that the present invention works to replace the oxidizing effect of the niter is particularly surprising given that niter adds oxygen directly to the batch, while the methods of the present invention add oxygen to the furnace atmosphere above the glass.

Thus, in one aspect of the present invention, a smaller quantity of nitrate containing compounds is employed in the batch for a glass making process than is normal for that particular process, and an excess amount of oxygen based on volume is added to the furnace. It has been found that, by providing excess oxygen, especially near the rear of the furnace where batch materials are added, and preferably in conjunction with the use of oxy-fuel burners in the melting furnace, the effects caused by removal of the niter is minimized. Consequently, when excess oxygen is employed in the furnace, preferably at least a portion, and more preferably a large portion of the total excess oxygen, is employed in the rear of the furnace.

Preferably, at least 10 volume percent of the total excess oxygen is added in the rear 25 percent of furnace length, more preferably greater than about 20 volume percent of the excess oxygen is added to the rear 25 percent of furnace length, and most preferably greater than about 50 volume percent of the excess oxygen is added to the rear 25 percent of furnace length.

Another aspect of the present invention relates to a method for making a lead containing glass comprising employing, in a glass melting furnace, a glass batch comprising up to about 70 weight percent lead and less than about 3 weight percent niter, more preferably less than 2 weight percent niter, and most preferably less than 1 weight percent niter; and utilizing at least 3 volume percent excess oxygen, more preferably at least 5 volume percent excess oxygen, in the melting furnace. Preferably, at least 10 volume percent of the total amount of excess oxygen is added in the rear 25 volume percent of furnace length. More preferably, at least 20 volume percent of the total excess oxygen is added in the rear 25 percent of furnace length. Most preferably, at least 50 volume percent of the total excess oxygen is added to the rear 25 percent of furnace length. In one such embodiment, no fuel is added to the furnace between the rear of said furnace up to and including the first burner port. Preferably, the niter employed is at least 30 percent by weight less niter than is normally employed in said batch.

The methods of the present invention result in a number of advantages over prior art methods for making glass. For example, because the amount of nitrogen containing compounds in the batch is reduced, the amount of NOX produced by the glass making process and emitted into the atmosphere is drastically reduced. The result is a tremendous savings to the glass making process, not only because an expensive batch material (niter) is removed from the glass batch, but also because of the savings generated by not having to invest in expensive equipment to remove the NOX from the furnace exhaust. For example, at one glass making process utilized to produce television funnel glass, the methods of the present invention have done away with the need for expensive ammonia injection equipment which would otherwise have to be employed to remove NOX from the exhaust, while still enabling the process to meet EPA requirements for NOX exhaust emissions. The methods of the present invention are particularly useful for making lead containing glasses, such as glass for television CRT necks, funnels, or face panels.

An added benefit achieved by utilizing a more oxidizing atmosphere in the furnace is a decrease in the amount of corrosion to silica refractories. Corrosion of silica refractories has been a large problem with most glass furnaces. However, by utilizing the methods of the present invention, such corrosion can be reduced, as explained hereinbelow.

DETAILED DESCRIPTION OF THE INVENTION

One embodiment of the present invention utilizes batch materials having less nitrate containing material than is normally employed for making said glass. To make up for the oxidizing ability lost by the decrease in nitrate containing materials, an excess amount of oxygen is added to the furnace. Excess amount of oxygen, as used herein, means an amount of oxygen which is greater than the stoichiometric requirements of the combustion process employed. For example, if gas-oxy burners are employed, each molecule of methane gas fuel requires 2 molecules of oxygen for perfect stoichiometric combustion to occur. Four molecules of oxygen would thus result in 100 percent excess oxygen in the system.

The excess oxygen can be added to the melting furnace via any means, e.g., through oxy-fuel burners, if they are employed, or through pipes, which are commonly referred to as lances, to introduce air, air enriched in oxygen, or commercial oxygen. By adding excess oxygen, it is meant that the oxygen is added or piped in via burners or lances, as opposed to accidentally leaking into the furnace, for example, through gaps in the insulating blocks.

Figure 1:
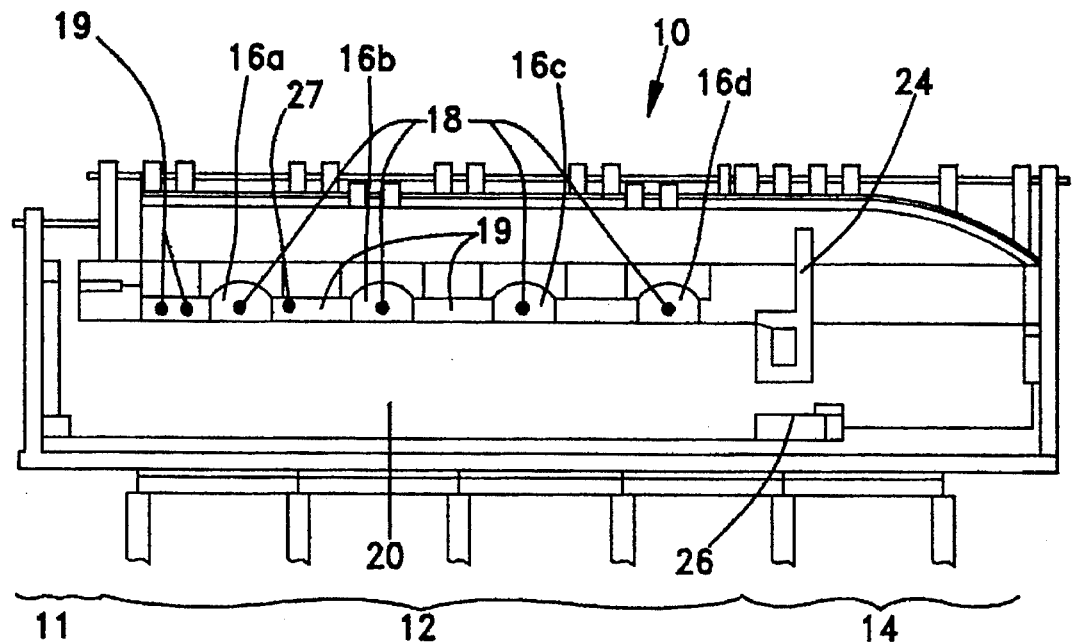
FIG. 1 illustrates a side cross-sectional view of a melting furnace in accordance with the present invention.
Figure 2:
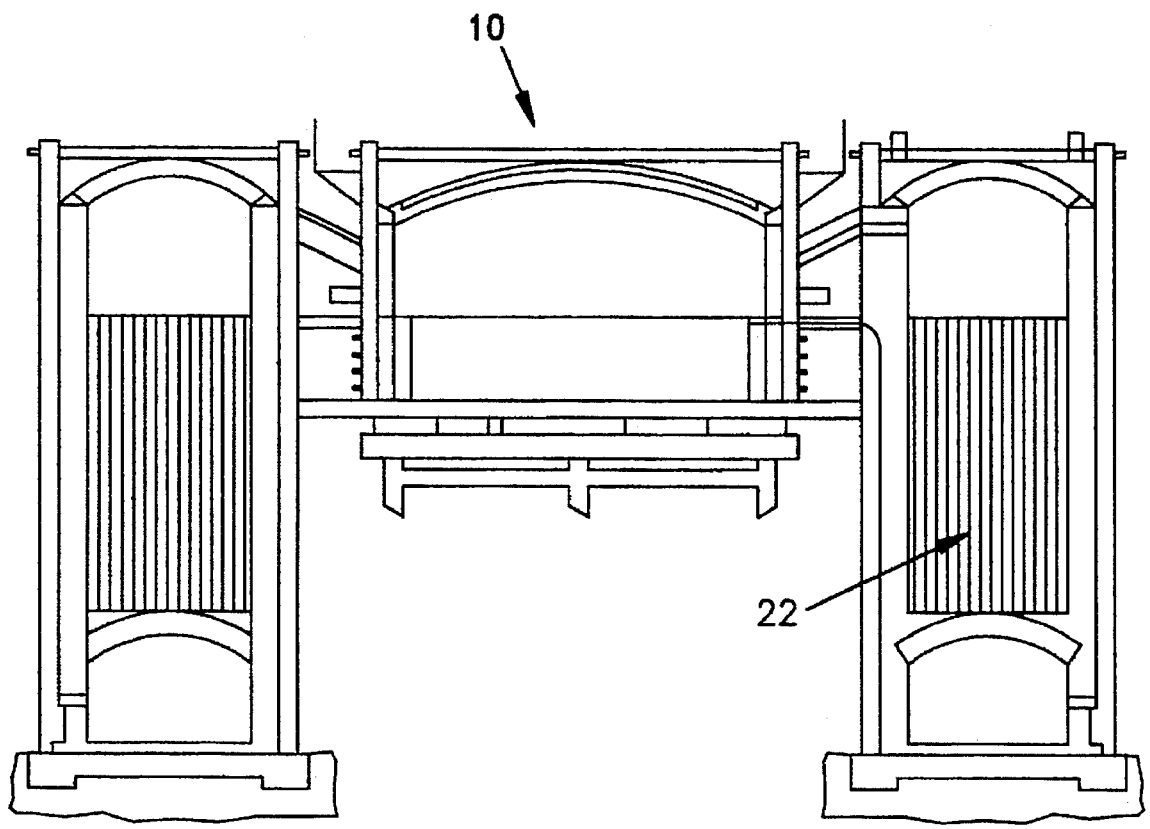
FIG. 2 illustrates a front cross-sectional view of a melting furnace in accordance with the present invention

FIGS. 1 and 2 illustrate a glass melting furnace in accordance with the present invention. While other forms of melting furnaces can be employed, the furnace illustrated herein is a cross-fired regenerative furnace. Such furnaces are commonly employed to manufacture lead-containing glasses, as well as soda-lime-silicate glasses, such as are manufactured using the float glass process. FIG. 1 illustrates a side cross-sectional or transverse view of the melting furnace, while FIG. 2 illustrates a front cross-sectional view of the glass melting furnace.

As illustrated in FIG. 1, the glass furnace 10 basically consists of three main sections, doghouse section 11, melting section 12 and refiner section 14. Batch materials are added, at what is typically referred to as the rear of the furnace, through doghouse 11. A plurality of ports 16a, 16b, 16c, and 16d are provided in melting section 12. These ports are commonly referred to in the industry as the number one, two, three, and four ports, respectively (i.e., they are numbered starting from the rear of the furnace where the batch is added). The ports 16 typically have burners 18 located therein which provide a hot flame over the surface of the molten glass 20. Of course, more or less ports and/or burners can be employed as desired (some furnaces employ up to seven ports, for example), depending on the particular glass being melted, tonnage per day, and so forth. In addition, lances 19 can be added at various locations within the furnace to add oxygen to the furnace. Such lances typically consist merely of an ordinary pipe which is utilized to force air or oxygen into the furnace. Such oxygen mixtures can vary from about 0.1 percent nitrogen to about 78 percent nitrogen (in the case of air), the remainder being primarily oxygen gas.

As illustrated in FIG. 2, regenerator checkers 22 are commonly employed on each side of furnace 10. Fuel provided to the burners 18 burns over the surface of the glass. In an operating sequence well known in the art, the airflow through the system and the fuel provided by the burners 18 on each side of the furnace (as well as the resultant waste gas flow) is reversed, typically at 15–30 minute intervals, to alternately heat each checker 22. Consequently, the hot combustion gases formed inside melting furnace 10 are circulated periodically from one side of the furnace into the refractory checker 22 on the other side. Production ranges for such furnaces typically vary from less than 150 to over 700 tons per day.

As illustrated in FIG. 1, melting section 12 is separated from the refining or conditioning section 14 by a refractory bridgewall 24. The opening between these two areas, called a throat 26, is beneath the surface and allows glass to flow but reduces surface contamination. Some flat glass furnaces may not have a bridgewall but may instead have a gablewall and a waist.

Although the methods of the present invention could be employed in the regenerative furnace illustrated in FIGS. 1 and 2, preferably the furnace employed uses only oxy-fuel burners 18, in which case the checkers 22 are not necessary, and the furnace will appear basically as illustrated in FIGS. 1 and 2 without the checkers 22. The oxy-fuel burners can be, for example, gas-oxygen or oil-oxygen burners, the preferred being gas-oxygen. The oxy-fuel burners have a fuel source and an oxygen source to provide fuel and oxygen, respectively, thereto.

In the preferred embodiment of the present invention, a more oxidizing atmosphere is employed at the rear of the melting furnace 10, near doghouse 11 where raw materials are added to the glass melt. In this way, a more oxidizing atmosphere will be provided to the glass until the raw materials are "glazed over". Glazing over typically occurs within the initial 15–25 percent of furnace length from the point of entry of the batch material to the bridgewall (or gablewall in float furnaces).

Consequently, in order to provide the more oxidizing atmosphere in the rear of the furnace where it is most needed (i.e., near where the batch is added), the rear of the furnace is operated at a condition of excess oxygen. For example, in order to provide a more oxidizing atmosphere prior to glazing over, it is desirable to employ an excess amount of oxygen in the area where glazing over occurs.

In one preferred embodiment, at least 10 volume percent of the total excess oxygen provided to the furnace is provided before glazing over of the batch material, or in other words, within the first 25 percent of the total furnace length. More preferably, at least 20 volume percent of the total excess oxygen provided by the burners 18 and lances 19 is provided within the first 25 percent of the total furnace length. Most preferably, at least 50 volume percent of the total excess oxygen provided by the burners 18 and lances 19 is provided within the first 25 percent of the total furnace length. Percentage of furnace length, as used herein, means the percentage of the distance from the point where the batch material is added to the bridgewall or gablewall.

One way to accomplish high amounts of oxygen in the rear of the furnace is to employ lances 19 between the doghouse and the number 1 burner port 16a, as illustrated in FIG. 1. In one preferred embodiment, no fuel is added to the furnace until the number 2 burner port. Consequently, in this embodiment, the first combusting burner (i.e., the first burner employing and burning fuel) is located in the number two burner port 16b.

These methods contravene conventional glass melting techniques because traditionally 25 percent of the total fuel in glass melting furnaces is combusted in the rear 25 percent of furnace length to ensure proper thermal profile for good mixing. This is especially true for gas/air fired furnaces, the burners of which are considerably less efficient at transferring heat to the glass.

However, as mentioned above, the present invention preferably employs oxy-fuel burners, which are more efficient at transferring heat to the glass melt. Because they are more efficient at transferring heat to the glass, we have found that the rear of the furnace can be operated at cooler temperatures and the remainder of the furnace heated with oxy-fuel burners without harming the quality of the resultant glass. Because the rear of the furnace can be operated at cooler temperatures, more excess oxygen (which has a tendency to cool the furnace) can now be added to the furnace without deleteriously effecting glass quality. For example, the silica crown temperatures in a furnace now employing gas/oxy and excess oxygen in accordance with the present invention typically runs between about 1450°–1470° C., whereas the same silica crown operating with air/fuel burners prior to the present invention ran between about 1600°–1620° C.

The added oxygen also serves to dilute corrosive gases present in the furnace. Normally, alkali metals from the molten glass, especially potassium and sodium, cause corrosion to the silica materials which make up parts of the furnace structure. This has been a large problem with most glass furnaces. However, by utilizing the methods of the present invention, such corrosion can be reduced. The excess oxygen dilutes the corrosive effects of alkali metals, and also serves to cool the rear of the furnace, where corrosion has been a particular problem.

In one preferred embodiment used to make television funnel glass, gas/oxy burners are employed in the number 2, 3, and 4 burner ports 16b, 16c, and 16d, respectively. The burners in these ports are operated to provide an oxygen fuel mixture which is approximately stoichiometric, that is, for every molecule of fuel provided by these burners, two molecules of oxygen are also provided by these burners. For this furnace, this stoichiometric amount of oxygen equates to about 50,000 cubic feet of oxygen gas. To provide excess oxygen to the system, 11,904 cubic feet of air is added through lances 19 which are located between doghouse 11 and the number one burner port 16a. The 11,904 cubic feet of air results in about 2500 cubic feet of excess oxygen to the furnace, all of which is added to the initial 25 percent of furnace length. In addition, approximately 4761 cubic feet of air is added to the furnace through lances 19 which are located in the front 75 percent of furnace length. The air added through these lances results in an additional 1000 cubic feet of oxygen added to the system. Thus, in this embodiment, there is 7 volume percent total excess oxygen, and of this total amount of excess oxygen, 71.4 percent is added in the initial 25 percent of furnace length. This would also contravene conventional melting techniques, especially those employing oxy-fuel burners, because one would think that the increased nitrogen provided by the air (as opposed to oxygen gas, which typically contains about 6 percent nitrogen) would result in increased NOX. However, in this preferred embodiment, at least a portion of the air added to the rear of the furnace is exhausted via exhaust ports 27 before the nitrogen in the air has an opportunity to react with the fuel. More preferably, most or all of the air added to the rear of the furnace is exhausted via exhaust ports 27 before the nitrogen in the air has an opportunity to react with the fuel. Consequently, this added air does not contribute appreciably to NOX production. Likewise, the excess air added to the front of the furnace causes little measurable appreciation in NOX. It is believed that one potential reason for this may be that the air or oxygen added in the front of the furnace tends to travel along the crown of the furnace and hence the majority of this air may be exhausted via exhaust ports located near the front of the furnace, such as exhaust ports 27.

In the present invention, there will be many cases where the number one burner port preferably is not utilized to burn fuel, in order to provide the rear of the furnace with a more oxidizing atmosphere. However, this is not to say that the number one burner port is not ever used to burn fuel. Indeed, during the start up procedure for a furnace, the number one burner port (which preferably employs an oxy-fuel burner) is preferably utilized to burn fuel, to provide more heat to the furnace system. During such start up operations, the burner in the number one burner port is operated at a high ratio of oxygen to fuel, preferably 3:1 (oxygen molecules to methane gas molecules), and more preferably 4:1. This again serves to provide a more oxidizing atmosphere in the rear of the furnace.

The invention is further illustrated by the following examples, which are meant to be illustrative, and not in any way limiting, to the claimed invention. Examples 1 and 2 compare the amount of niter compounds in several lead containing glasses (Example 1), compared to the amount of niter employed using excess oxygen gas in accordance with the present invention (Example 2). The TV neck and diode glass compositions were computer calculated for melting in a gas/oxy furnace, while the remainder of the glass batches in both examples were melted in furnaces utilizing only gas/oxy burners. Relative amounts are in weight percents of material added to the batch.

EXAMPLE 1

In the batch configurations illustrated in Table 1, the amount of total excess oxygen employed in the furnace was approximately 1.5 to 2.5 volume percent excess oxygen. The percentages in Table 1 are based on weight.

TABLE 1

|  | % Pb | KNO$_3$ | NaNO$_3$ |
| --- | --- | --- | --- |
| TV neck glass | 30 | 1.8 |  |
| Diode glass | 55–70 |  | 1.5 |
| TV panel glass | 0–2 | 2.4–4 |  |
| TV panel glass | 0–2 |  | 2.5–4 |
| TV funnel glass | 26 | 3.5 |  |

EXAMPLE 2

In the batch configurations illustrated in Table 2, approximately 10 to 15 volume percent excess oxygen was employed, two thirds of which was added in the rear 15 percent of furnace length. The percentages in Table 2 are based on weight.

TABLE 2

|  | % Pb | KNO$_3$ | NaNO$_3$ |
| --- | --- | --- | --- |
| TV neck glass | 30 | .9 |  |
| Diode glass | 55–70 |  | .75 |
| TV panel glass | 0–2 | 1.8 |  |
| TV panel glass | 0–2 |  | 1.8 |
| TV funnel glass | 26 | 1.6 |  |

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A method for reducing the amount of nitrate containing compounds in a batch for a glass making process normally employing such nitrate containing compounds in a batch, comprising:

employing, in a furnace used to melt glass, an amount of a nitrate containing compound in said glass batch which is less than the amount of nitrate containing compound normally utilized in said batch; and adding excess oxygen into said furnace in an amount which is sufficient to replace at least some of the oxidizing effect which would otherwise be lost by said employing less nitrate step.

2. The method of claim 1, wherein said employing step comprises employing a niter compound used to prevent reduction of a metal in said batch, and said amount of niter is less than that normally utilized in said batch.

3. The method of claim 2, wherein said employing step comprises employing a niter compound in a lead containing glass batch, and said adding excess oxygen step comprises adding at least three volume percent excess oxygen to said furnace.

4. The method of claim 2, wherein said employing step comprises employing a niter compound in a lead containing glass batch, and said adding excess oxygen step comprises adding at least five volume percent excess oxygen to said furnace.

5. The method of claim 1, wherein said furnace has a furnace length, and said adding step comprises adding greater than about 10 volume percent of said excess oxygen to the rear 25 percent of said furnace length.

6. The method of claim 1, wherein said furnace has a furnace length, and said adding step comprises adding greater than about 20 volume percent of said excess oxygen to the rear 25 percent of said furnace length.

7. The method of claim 1, wherein said furnace has a furnace length, and said adding step comprises adding greater than about 50 volume percent of said excess oxygen to the rear 25 percent of said furnace length.

8. The method of claim 2, wherein said furnace has a furnace length, said method further comprises heating said glass batch utilizing a plurality of oxy-fuel burners, each of said oxy-fuel burners comprising a fuel source and an oxygen source, said burners in a rear 20 percent of said furnace length receiving no fuel; and said adding step comprises adding at least ten volume percent of said excess oxygen to the furnace within a rear 25 percent of said furnace length.

9. The method of claim 4, wherein said adding excess oxygen step comprises adding air into said furnace within a rear 25 percent of said furnace length.

10. The method of claim 8, wherein said furnace further comprises a first burner for combusting fuel, and said method further comprises exhausting at least a portion of said air from said furnace prior to said first burner for combusting fuel.

11. A method for making a lead containing glass comprising:

employing a glass batch comprising up to about 70 weight percent lead and less than about 3 weight percent niter in a glass melting furnace having a furnace length; and utilizing at least three volume percent excess oxygen in said furnace to melt said glass.

12. The method of claim 11, wherein said employing step comprises employing at least 30 percent by weight less niter than is normally employed in said batch.

13. The method of claim 11, wherein said adding step comprises adding said excess oxygen to said furnace, and greater than about 10 volume percent of said excess oxygen is added to the rear 25 percent of furnace length.

14. The method of claim 11, wherein said adding step comprises adding said excess oxygen to said furnace, and greater than about 20 volume percent of said excess oxygen is added to the rear 25 percent of furnace length.

15. The method of claim 11, wherein said adding step comprises adding said excess oxygen to said furnace, and greater than about 50 volume percent of said excess oxygen is added to the rear 25 percent of furnace length.

16. The method of claim 11, wherein said furnace further comprises a first burner port, and said method further comprises utilizing no fuel in said furnace from the rear area of said furnace up to and including the first burner port.

17. The method of claim 1, wherein said amount of nitrate containing compound is at least 30% less than the amount of nitrate containing compound normally utilized in said batch.

18. A method for reducing the amount of nitrate containing compounds in a batch for a lead-containing glass making process normally employing such nitrate containing compounds in a batch, comprising:

employing, in a furnace used to melt lead-containing glass, an amount of a nitrate containing compound in said glass batch which is less than the amount of nitrate containing compound normally utilized in said lead-containing batch; and adding excess oxygen into said furnace in an amount which is sufficient to replace at least some of the oxidizing effect which would otherwise be lost by said employing less nitrate step.

19. A method for reducing the amount of nitrate containing compounds in a batch for a CRT neck, funnel, or face plate panel glass making process normally employing such nitrate containing compounds in said batch, comprising:

employing, in a furnace used to melt CRT neck, funnel, or face plate panel glass, an amount of a nitrate containing compound in said glass batch which is less than the amount of nitrate containing compound normally utilized in said batch; and adding excess oxygen into said furnace in an amount which is sufficient to replace at least some of the oxidizing effect which would otherwise be lost by said employing less nitrate step.

20. The method of claim 19, wherein said furnace has a furnace length, and said adding step comprises adding greater than about 10 volume percent of said excess oxygen to the rear 25 percent of said furnace length.

* * * * *